Patented Dec. 3, 1935

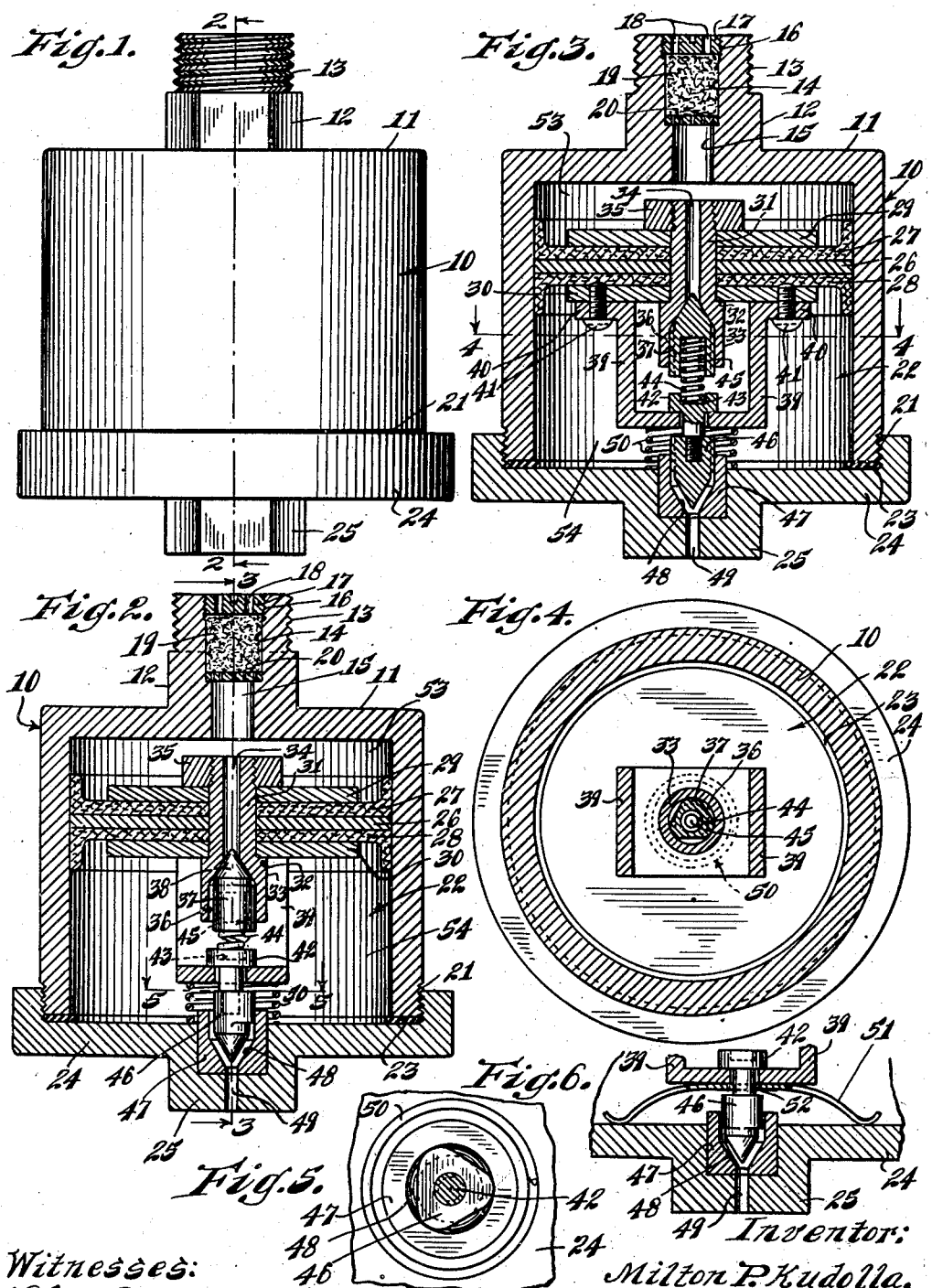
Dec. 3, 1935. M. P. KUDOLLA 2,022,724
AUTOMATIC DRAIN VALVE
Filed March 14, 1934

2,022,724

UNITED STATES PATENT OFFICE 2,022,724

AUTOMATIC DRAIN VALVE

Milton P. Kudolla, Chicago, Ill.

Application March 14, 1934, Serial No. 715,428

6 Claims. (Cl. 137—103)

My invention relates to automatic drain valves and has for an object the provision of a valve which may be placed at the base of a compressed air tank and employed to permit escape of water of condensation from the tank and from the valve without the intervention of an operator. I am aware that generally speaking such devices have been heretofore provided and one of such devices is disclosed in my Patent No. 1,907,299, which issued on an application filed by me on March 21, 1932, given Serial No. 600,356, and entitled, "Automatic drain devices".

Some difficulties have arisen in connection with the use and operation of prior art devices of this character, and an object of the present invention is to eliminate these difficulties.

Some of these difficulties have been the necessity of employing a particular type of spring for each particular installation in which the maximum and minimum of air pressure in the compression tank have been varied. For instance, a tank having a maximum pressure of one hundred pounds and a minimum pressure of eighty-five pounds might require one spring, and a tank having a maximum pressure of seventy-five pounds and a minimum of sixty-five pounds might require another spring. This feature of course requires that a plurality of accurately made and expensive springs be kept in stock for assembly with the valves which are to be employed with the different tanks. The present invention entirely eliminates this difficulty and the valve may be employed on any tank adapted for any maximum pressure or any minimum pressure within very broad limits. Another difficulty heretofore experienced has been due to the provision of very complicated mechanism and subsequent failure of some working parts.

Other objects of my invention are economy of construction, simplicity of construction, and perfection of operation. Because of these features seldom needed repairs may be made easily and quickly and any needed grinding of the valves may be accomplished very easily.

Other objects will appear hereinafter.

My invention may be best understood by reference to the accompanying drawing, in which:

Fig. 1 is a side elevational view of my device in the position in which it is found in the ordinary installation on a compressed air tank;

Fig. 2 is a sectional view taken substantially on the line 2—2 of Fig. 1;

Fig. 3 is a sectional view taken substantially on the line 3—3 of Fig. 2;

Fig. 4 is a sectional view taken substantially on the line 4—4 of Fig. 3;

Fig. 5 is a sectional view taken substantially on the line 5—5 of Fig. 2; and

Fig. 6 is a detail view in section of a modified form of spring which may be employed in place of the ordinary coil spring in the lower part of my device.

Referring now to Figs. 1 and 2, my device comprises a cylindrical cup-shaped housing 10 having a closed end 11 with a centrally disposed boss 12 having an externally threaded end 13, an axial bore 14, and a reduced axial bore 15. The upper portion of bore 14 is internally threaded as at 16 to receive a locking plug 17 having longitudinally extending slots 18 for the admission of water of condensation from the compressed air tank (not shown on the drawing but well-known in the art and shown in my issued patent heretofore mentioned). Beneath the plug 17 straining material 19 is placed for removing any solid substances from the water of condensation, and a screen 20 supports straining material 19 at its base.

The opposite end of cylindrical housing 10 is externally threaded as at 21 and is open at the opposite end also. Thus a longitudinally extending cylinder 22 is provided within the housing and is in communication with the restricted bore 15. Likewise the diametrical dimensions of cylindrical bore 22 are uniform throughout the length of said bore. A packing gasket 23 in the form of a ring may be placed on the annular end of housing 10, and an internally threaded screw cap 24 having a wrench engaging stud 25 may be screwed onto the threaded end 21 in order to close the end of the cylinder.

A longitudinally slidable piston structure is provided within cylinder 22 by a circular disc 26 and other parts later to be described. The disc 26 is of sufficient diametrical dimension to provide a close sliding fit with the wall of cylinder 22, and an upper packing leather cup 27 is preferably placed on the upper face of disc 26 with the open end of the cup upward. A similar packing leather cup 28 is preferably provided and placed upon the lower face of disc 26 with the open end of the cup toward the bottom of the device. Within the open end of cup 27 a retaining disc 29 is placed in axial alignment with packing cup 27, disc 26, and cup 28. In the open end of packing leather cup 28 a similar disc 30 is arranged in a similar manner so that the packing leather cups and the disc 26 are pressed between discs 29 and 30. It is of course understood that the packing leather cups 27 and 28 are of sufficient diametrical dimension to effect an air-tight sliding connection with the wall of cylinder 22.

Disc 26, packing leather cups 27 and 28, and discs 29 and 30 are provided with annular axial apertures through which a clamping bolt 31 is adapted to extend. The bolt 31 is also formed with an enlarged abutting shoulder 32 and an elongated head 33. An axial cylindrical bore 34 extends from the upper end of bolt 31 to a valve seat later to be described and thus affords a communicating passage between the portion of the cylinder 22 above the disc 26 and the portion of the cylinder which is below the disc 26. The upper end of clamping bolt 31 is externally threaded to engage the internal threads of a clamping nut 35.

The lower enlarged end 33 of clamping bolt 31 carries an enlarged axial bore 36 which is connected by a conical valve seat with bore 34 heretofore mentioned. Within the bore 36 is arranged a valve member 37 having a conical valve head 38 which of course cooperates with the conical valve seat heretofore mentioned in closing the bore 34 from communication with the bore 36. The valve member 37 is somewhat triangular shaped in cross-section as can be seen in Fig. 4, and the apexes thereof are adapted to slide along the interior cylindrical walls of bore 36 and provide a guide for the valve head 38.

Referring now to Fig. 3 a substantially U-shaped bracket 39 may carry laterally extending attaching lugs 40 having appropriate bolt hole openings, and the disc 30 may be tapped and threaded at diametrically opposite points to receive anchoring screws 41. In the base of bracket 39 and in axial alignment with bore 34 the conical valve seat communicating with bore 34 and also in axial alignment with bore 36 is arranged an annular aperture through which a bolt 42 is adapted to extend. The bolt 42 carries in the upper face of its disc-like head a dished spring seat recess 43 for the reception of a coil spring 44 whose opposite end is incased in a bore 45 in the lower end of valve member 37. The lower end of bolt 42 extends through the aperture in the base of bracket member 39 and is threaded to engage the internal threads in the body of a valve member 46. The cap 24 heretofore mentioned carries an enlarged axial bore in which a plug 47 is arranged, and a valve seat 48 is carried in the upper face of plug 47. The valve 46 just mentioned cooperates with the valve seat 48 in closing the bore in plug 47. The lower end of plug 47 is open and communicates with a bore 49 which is arranged axially of the cap 24 and extends through wrench engaging stud 25. The bore 49 thus communicates with the atmosphere and when the valve 46 is open water of condensation is permitted to drain from the lower part of cylinder 22. A coil spring 50 is preferably interposed between the lower face of bracket 39 and the upper inner face of cap 24 and also arranged around the upper end of plug 47 so as to be kept in proper alignment by the protruding end of said plug 47. The main body of valve 46 is preferably of a somewhat triangular shape as is valve member 37 so that the apexes on the lateral faces will serve as guides for the valve and yet there will be sufficient space for the escape of liquid past the valve when it is open.

A modified form of spring may be substituted in place of spring 50 and may be seen at 51 in Fig. 6. An aperture 52 is arranged intermediate the ends of the leaf spring 51 and receives the end of bolt 42 therethrough. The function of leaf spring 51 is similar to that of spring 50.

From the foregoing description it can be seen that there are two chambers provided within the cylindrical housing 10, namely, the upper inlet chamber 53 and the lower outlet chamber 54, and the valve 37 periodically opens and closes a communicating passage between these chambers.

In operation my drain valve is employed at the base of an air compressor tank adapted for a certain maximum pressure and a certain minimum pressure. For example, if the air compressor tank is adapted for one hundred pounds maximum pressure and a minimum pressure of eighty-five pounds, it can be seen that when the maximum pressure is in the tank the piston-like member separating chambers 53 and 54 will be forced downwardly from a position shown in Fig. 2. When piston member reaches the limit of its downward travel the lower face of bracket 39 will be impinging upon the upper face of valve 46 in order to cause the closing of said valve. At substantially the same moment the high pressure in chamber 53 will cause the unseating and consequent opening of valve 37 and since the coil spring 44 is preferably made so as to resist a pressure of a few pounds, such as five pounds pressure, the pressure in the lower chamber 54 will be built up until there is no longer a sufficient differential between the pressures of chambers 53 and 54 to maintain the valve 37 in an open position. At this time the valve will be closed by the spring pressure of the said spring 44, and this condition will remain until the pressure in the compressor tank is materially reduced. During the period of time while the valve head 38 is out of contact with its seat any water of condensation in the upper chamber 53 may drain into the lower chamber 54. When the pressure in the compressor tank is reduced to a pressure of ninety pounds for example the pressure in the lower chamber 54 will of course be greater than ninety pounds, depending upon the strength of spring 44. If however the spring 44 is adapted to resist a pressure of five pounds the pressure in the lower chamber should be about ninety-five pounds. The greater pressure beneath the piston member will of course force it upwardly and carry with it bracket member 39. When this happens the base of bracket member 39 will exert an upper force on the head of bolt 42 and carry upwardly the valve 46. The water of condensation in the lower chamber 54 will then be free to pass out of the valve through outlet bore 49. Of course when the valve 46 is opened the air pressure in outlet chamber 54 is reduced at the same time that the water of condensation passes out through outlet bore 49. As soon as the pressure is decreased to a point where the pressure in the compressor tank is sufficiently great to force the piston member downward against the action of spring 50 the valve 46 is again closed and remains closed until a subsequent drain period follows through the same procedure as outlined above. This opening and closing action continues intermittently during use of the compressor tank so that it is kept practically dry of condensed moisture. The spring 50 is adapted to resist a pressure of about five pounds preferably, and in actual test the valve 46 closes when the air pressure in outlet chamber 54 falls about five pounds below the pressure of the inlet chamber 53.

The spring 50 of the modified form 51 will assist in raising the bracket and piston member during the drain time; this spring also acts as a cushion for the bracket 39 when air pressure is suddenly increased within the compressor tank and hence likewise increased in chamber 53.

All the parts of the device are readily accessible for any necessary adjustment or repair when the cap 24 is removed.

While I have shown and described my preferred form of construction I do not wish to be limited to the details herein shown and described but wish to avail myself of all variations coming within the scope of the appended claims.

Having thus described my invention, what I claim as new and desire to secure by Letters Patent is:

1. A device of the character described comprising a housing having a cylinder therein, a piston member dividing said cylinder into an inlet chamber and an outlet chamber, an inlet passage adapted to communicate between said inlet chamber and the interior of a compressor tank, an intercommunicating passage connecting said inlet chamber and said outlet chamber, an outlet passage communicating between said outlet chamber and the atmosphere, and means for maintaining said intercommunicating passage in a closed condition and opening said outlet passage when the air pressure in said inlet chamber falls below the air pressure in said outlet chamber to any considerable extent.

2. A device of the character described comprising a housing having a cylinder therein, a piston member separating the cylinder into an inlet chamber and an outlet chamber, an intake passage adapted to communicate between the intake chamber and a compressed air tank, a communicating passage between said inlet chamber and said outlet chamber, a valve for closing said last mentioned passage, an outlet passage from said outlet chamber communicating with the atmosphere, an outlet valve for closing said outlet passage, means connected to said piston member and the outlet valve and adapted to actuate the outlet valve to close the outlet passage when said piston is moved in one direction and to open said passage when said piston is moved in the opposite direction, and a spring member supported by said means for urging the first said valve for closing said communicating passage between said inlet chamber and said outlet chamber into closed position.

3. A device of the character described comprising a housing having a cylinder therein, a piston member dividing said cylinder into an inlet chamber and an outlet chamber, a passage connecting said inlet chamber with the interior of a compressor tank, an intercommunicating passage extending between said inlet chamber and said outlet chamber, an outlet passage communicating between said outlet chamber and the atmosphere, a spring urged valve for closing said intercommunicating passage, a valve for closing said outlet passage, and means connected to said piston member for opening and closing said last mentioned valve, said means also being adapted to serve as a spring support for said spring urged intercommunicating passage valve.

4. A device of the character described comprising a housing having a cylinder therein, a piston member dividing said cylinder into an inlet chamber and an outlet chamber, a passage connecting said inlet chamber with the interior of a compressor tank, an intercommunicating passage extending between said inlet chamber and said outlet chamber, an outlet passage communicating between said outlet chamber and the atmosphere, a spring urged valve for closing said intercommunicating passage, a valve for closing said outlet passage, and a U-shaped bracket member secured to the outlet face of said piston member and adapted to serve as a spring support for said spring urged valve and being adapted to open and close said outlet valve as said piston member is moved in said cylinder.

5. A device of the character described comprising a housing having a cylinder therein, a piston member dividing said cylinder into an inlet chamber and an outlet chamber, an inlet passage adapted to communicate between said inlet chamber and the interior of a compressor tank, an intercommunicating passage connecting said inlet chamber and said outlet chamber, an outlet passage communicating between said outlet chamber and the atmosphere, and means for maintaining said intercommunicating passage in a closed condition and opening said outlet passage when the air pressure in said inlet chamber falls below the air pressure in said outlet chamber to any considerable extent, said means also being adapted to close said outlet passage when the air pressure in the outlet chamber falls below the air pressure in the inlet chamber to any considerable extent.

6. A device of the character described comprising a housing having a cylinder therein, a piston member dividing said cylinder into an inlet chamber and an outlet chamber, an inlet passage adapted to communicate between said inlet chamber and the interior of a compressor tank, an intercommunicating passage connecting said inlet chamber and said outlet chamber, an outlet passage communicating between said outlet chamber and the atmosphere, valves controlling said intercommunicating passage and said outlet passage respectively, and means for maintaining the valve controlling said intercommunicating passage in a closed condition and opening the valve controlling said outlet passage when the air pressure in said inlet chamber falls below the air pressure in said outlet chamber to any considerable extent.

MILTON P. KUDOLLA.